United States Patent
Ellison et al.

(10) Patent No.: US 7,789,052 B2
(45) Date of Patent: Sep. 7, 2010

(54) VARIABLE VALVE ACTUATOR HAVING SELF-CENTERING PIVOTAL PISTON

(75) Inventors: Mark Steven Ellison, Chillicothe, IL (US); Anthony Kok-Fai Chan, Peoria, IL (US); John Henry Nguyen, Peoria, IL (US); John Stephen Pipis, Jr., Washington, IL (US)

(73) Assignee: Caterpillar Inc., Peoria, IL (US)

( * ) Notice: Subject to any disclaimer, the term of this patent is extended or adjusted under 35 U.S.C. 154(b) by 194 days.

(21) Appl. No.: 11/819,913

(22) Filed: Jun. 29, 2007

(65) Prior Publication Data

US 2009/0000581 A1   Jan. 1, 2009

(51) Int. Cl.
*F01L 1/34* (2006.01)
(52) U.S. Cl. ............... 123/90.16; 123/90.15; 123/90.1
(58) Field of Classification Search ............ 123/90.16, 123/90.15, 90.1, 90.65, 90.39
See application file for complete search history.

(56) References Cited

U.S. PATENT DOCUMENTS

| | | | |
|---|---|---|---|
| 2,847,261 A | 8/1958 | Cornelius | |
| 2,918,338 A | 12/1959 | Grad | |
| 3,095,221 A | 6/1963 | Kaup | |
| 4,515,346 A * | 5/1985 | Gaterman, III | 251/337 |
| 5,165,375 A | 11/1992 | Hu | |
| 5,195,489 A * | 3/1993 | Reich | 123/321 |
| 5,357,926 A | 10/1994 | Hu | |
| 5,479,896 A * | 1/1996 | Freiburg et al. | 123/90.16 |
| 5,645,031 A | 7/1997 | Meneely | |
| 5,806,477 A | 9/1998 | Regueiro | |
| 6,718,846 B1 | 4/2004 | Ellison | |
| 7,152,576 B2 | 12/2006 | Vanderpoel et al. | |
| 7,213,553 B2 | 5/2007 | Kalish et al. | |
| 2005/0000499 A1 | 1/2005 | Ruggeiro et al. | |

FOREIGN PATENT DOCUMENTS

| | | |
|---|---|---|
| DE | 19505406 | 8/1996 |
| DE | 19706439 | 8/1998 |
| EP | 0301267 | 2/1989 |
| EP | 0688981 | 12/1995 |

* cited by examiner

*Primary Examiner*—Zelalem Eshete
(74) *Attorney, Agent, or Firm*—Finnegan, Henderson, Farabow, Garrett & Dunner

(57) ABSTRACT

A variable valve actuator for a power system is provided. The variable valve actuator may have a hydraulic piston extendable to interrupt cyclical movement of an engine valve. The variable valve actuator may also have a pin member pivotally received by the hydraulic piston, and a retaining ring configured to axially align the pin member with the hydraulic piston as the hydraulic piston is retracted.

14 Claims, 4 Drawing Sheets

VARIABLE VALVE ACTUATOR HAVING SELF-CENTERING PIVOTAL PISTON

TECHNICAL FIELD

The present disclosure is directed to a variable valve actuator and, more particularly, to a variable valve actuator having a self-centering pivotal piston.

BACKGROUND

An internal combustion engine typically includes at least one cylinder that receives a piston to form a combustion chamber. The piston is connected to a crankshaft such that a rotation of the crankshaft results in a corresponding reciprocating motion of the piston within the cylinder. Intake and exhaust valves associated with each combustion chamber are indirectly connected to the same crankshaft by way of a cam arrangement such that a rotation of the crankshaft results in corresponding opening and closing movements of the intake and exhaust valves. The shape of cam lobes within the cam arrangement governs valve lift during actuation of the intake and exhaust valves. Thus, the movements of engine valves and the motion of the associated piston, because of their connections to a common crankshaft, are typically fixed and synchronized.

In some situations, however, it may be desirable to disconnect or otherwise modify the movement relationship between the engine valves and the piston. For example, the exhaust valves may be opened early to provide engine braking, or held open late to facilitate operation in the Miller Cycle. Similarly, open durations of the intake and/or exhaust valves may be caused to overlap, thereby implementing internal exhaust gas recirculation. In any of these situations, a variable valve actuator (VVA) is required to modify valve opening profiles away from the typical cyclical motion induced by the cam arrangement.

One common VVA includes a hydraulic piston situated to act on a rocker arm. The rocker arm is connected between the cam arrangement and the engine valves to pivot and, thereby, transmit the rotational motion of the cam lobes to the translational motion of the engine valves. At an appropriate time in the opening/closing cycle of an engine valve, the hydraulic piston is driven by fluid pressure to engage the rocker arm and disconnect the rocker arm from the associated cam lobe. As long as the hydraulic piston remains engaged with the rocker arm, the cam lobe has little affect, if any, on the motion of the valve. At a predetermined time, the hydraulic piston is withdrawn from the rocker arm to return the driving motion of the engine valve to the cam arrangement.

Although the described VVA may adequately adjust valve actuation, it may be problematic. Specifically, as the piston is driven to engage the rocker arm, the engaging end of the piston impacts the rocker arm with significant force and then slides along a surface of the rocker arm. The sliding is caused by differential paths between the two components. That is, the rocker arm motion is rotational, but the piston motion is purely translational. This difference in motion creates the differential surface slip at the interface between the piston and the rocker arm. The impact, combined with the slip, can result in failure of the piston and/or the rocker arm at the engagement site.

One attempt at minimizing wear at the interface of the piston and the rocker arm is described in U.S. Pat. No. 6,718,846 (the '846 patent) issued to Ellison on Apr. 13, 2004. Specifically, the '846 patent describes an apparatus for aligning a cylindrical actuator (i.e., piston) with a bearing member, the bearing member having a planar surface configured to bear against and slide relative to a pivoting rocker arm during translational movement of the cylindrical actuator. The cylindrical actuator has a spherical end received by a spherical opening of the bearing member. The bearing member is held in swiveling contact with the cylindrical actuator by the spherical end of the cylindrical actuator and by a spring retainer located on the actuator at a distance from the spherical end. A spring is located about the actuator, from the spring retainer to the bearing member, such that a spring force is placed on the bearing member to maintain alignment of the bearing member with an axis of the cylindrical actuator. During pivoting motion of the rocker arm, the bearing member slides along the rocker arm and spreads the bearing force transmitted from the cylindrical actuator to the rocker arm across the area of the bearing member. As the cylindrical actuator withdraws from the rocker arm, the bearing member is maintained in contact with the actuator and also withdraws from the rocker arm.

Although the apparatus of the '846 patent may help to minimize wear at the piston/rocker arm interface, it may still be problematic. Specifically, the bearing member of the '846 patent may be under constrained. As such, perpendicularity of the cylindrical actuator relative to the rocker arm may be difficult to maintain, resulting in wear of the spring retainer through side loading. In addition, it may be possible for the bearing member to wander on the rocker arm, resulting in excessive wear of the rocker arm.

The variable valve actuator of the present disclosure solves one or more of the problems set forth above.

SUMMARY

In one aspect, the present disclosure is directed to a variable valve actuator. The variable valve actuator may include a hydraulic piston extendable to interrupt cyclical movement of an engine valve. The variable valve actuator may also include a pin member pivotally received by the hydraulic piston, and a retaining ring configured to axially align the pin member with the hydraulic piston as the hydraulic piston is retracted.

In another aspect, the present disclosure is directed to another variable valve actuator. This variable valve actuator may include a hydraulic piston extendable to interrupt cyclical movement of an engine valve, and a pin member pivotally received by the hydraulic piston. The pin member may include a first element having a curved surface pivotally received by the hydraulic piston, and a second element joined to the first element and received by a valve actuation assembly.

DETAILED DESCRIPTION

Figure 1:
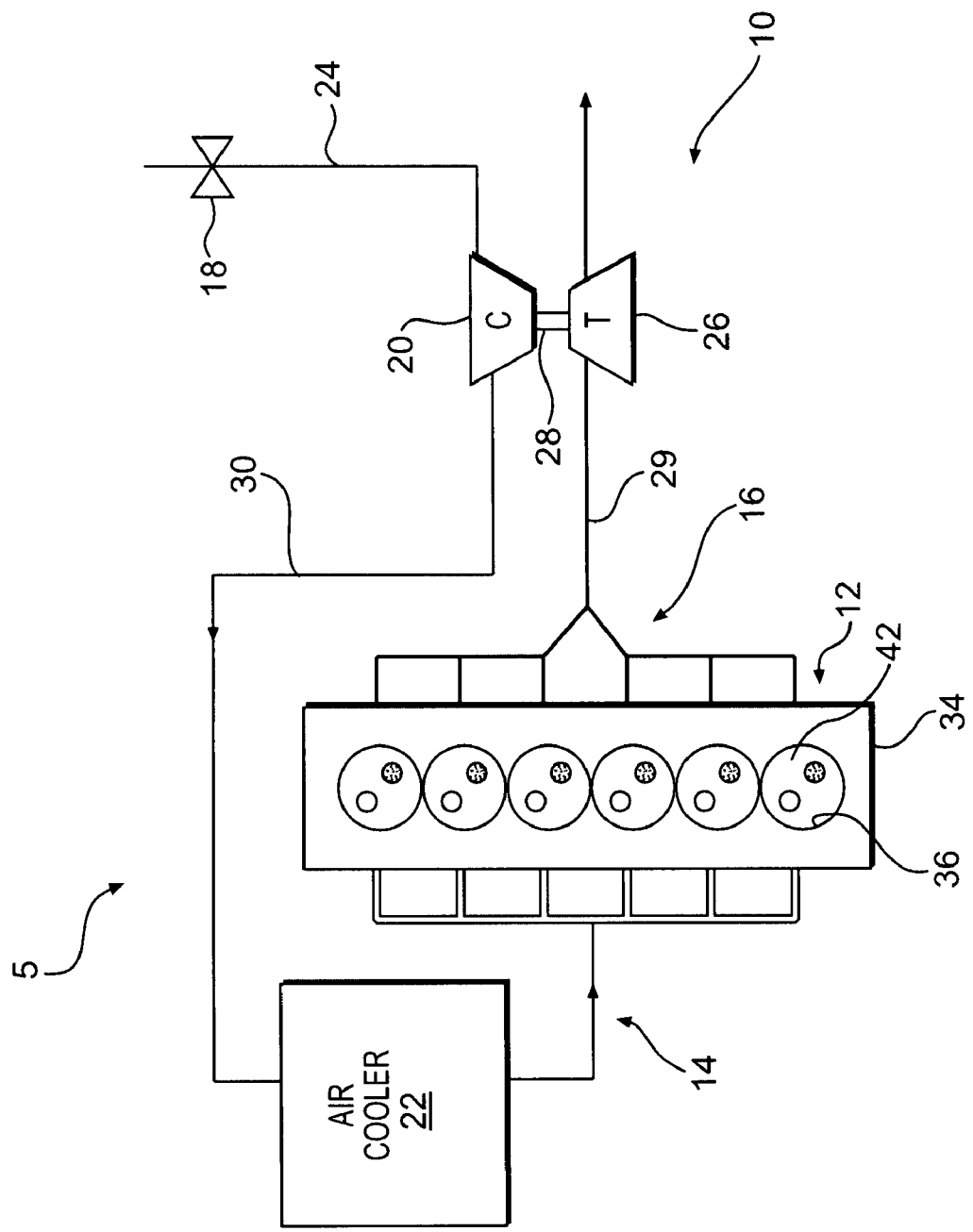
FIG. 1 is a schematic illustration of an exemplary disclosed power system.

FIG. 1 illustrates a power system 5 having a fluid handling system 10 configured to direct compressed air into and exhaust gases from a power source 12. Fluid handling system 10 may include an air induction system 14 and an exhaust system 16. Air induction system 14 may direct fresh air or a mixture of air and exhaust into power source 12, while exhaust system 16 may direct exhaust from power source 12 to the atmosphere and/or back into power source 12 for subsequent combustion. It is contemplated that fluid handling system 10 may include additional subsystems such as, for example, an exhaust aftertreatment system, an external exhaust gas recirculation system, and other systems known in the art.

Air induction system 14 may include components configured to introduce charged air into power source 12. For example, air induction system 14 may include an induction valve 18, one or more compressors 20, and an air cooler 22. Compressors 20 may draw air through induction valve 18 and push the air though air cooler 22 to power source 12. It is contemplated that additional components may be included within air induction system 14 such as, for example, additional valving, one or more air cleaners, one or more waste gates, a control system, and other means for introducing charged air into power source 12. It is also contemplated that power source 12 may alternatively be naturally aspirated rather than turbocharged, if desired.

Induction valve 18 may be fluidly connected to compressors 20 via a fluid passageway 24 and configured to regulate the flow of atmospheric air to power source 12. Induction valve 18 may embody a shutter valve, a butterfly valve, a diaphragm valve, a gate valve, or any other type of valve known in the art. Induction valve 18 may be solenoid-actuated, hydraulically-actuated, pneumatically-actuated, or actuated in any other manner in response to one or more predetermined conditions.

Compressor 20 may compress the air flowing into power source 12 to a predetermined pressure level. Compressors 20, if more than one is included within air induction system 14, may be disposed in a series or parallel relationship and fluidly connected to power source 12 via a fluid passageway 30. Compressor 20 may embody a fixed geometry compressor, a variable geometry compressor, or any other type of compressor known in the art. It is contemplated that compressed air may be diverted from fluid passageway 30 for other uses, if desired.

Air cooler 22, if used, may embody an air-to-air heat exchanger, an air-to-liquid heat exchanger, or a combination of both, and be configured to facilitate the transfer of thermal energy to or from the air directed into power source 12. For example, air cooler 22 may include a shell and tube-type heat exchanger, a corrugated plate-type heat exchanger, a tube and fin-type heat exchanger, or any other type of heat exchanger known in the art. Air cooler 22 may be disposed with fluid passageway 30, between compressor 20 and power source 12. It is contemplated that an additional air cooler may be located upstream of compressor 22, if desired.

Exhaust system 16 may include a means for directing exhaust flow out of power source 12. For example, exhaust system 16 may include one or more turbines 26 connected in a series or parallel relationship. It is contemplated that exhaust system 16 may include additional components such as, for example, particulate traps, NOx absorbers or other catalytic devices, attenuation devices, and other means for directing exhaust flow out of power source 12 that are known in the art.

Each turbine 26 may be connected to one or more compressor 20 of air induction system 14 by way of a common shaft 28 to drive the connected compressor 20. In particular, as the hot exhaust gases exiting power source 12 move through an exhaust passageway 29 to turbine 26 and expand against blades (not shown) of turbine 26, turbine 26 may rotate and drive the connected compressor 20. It is also contemplated that turbine 26 may be omitted and compressor 20 driven by power source 12 mechanically, hydraulically, electrically, or in any other manner known in the art, if desired.

Figure 2:
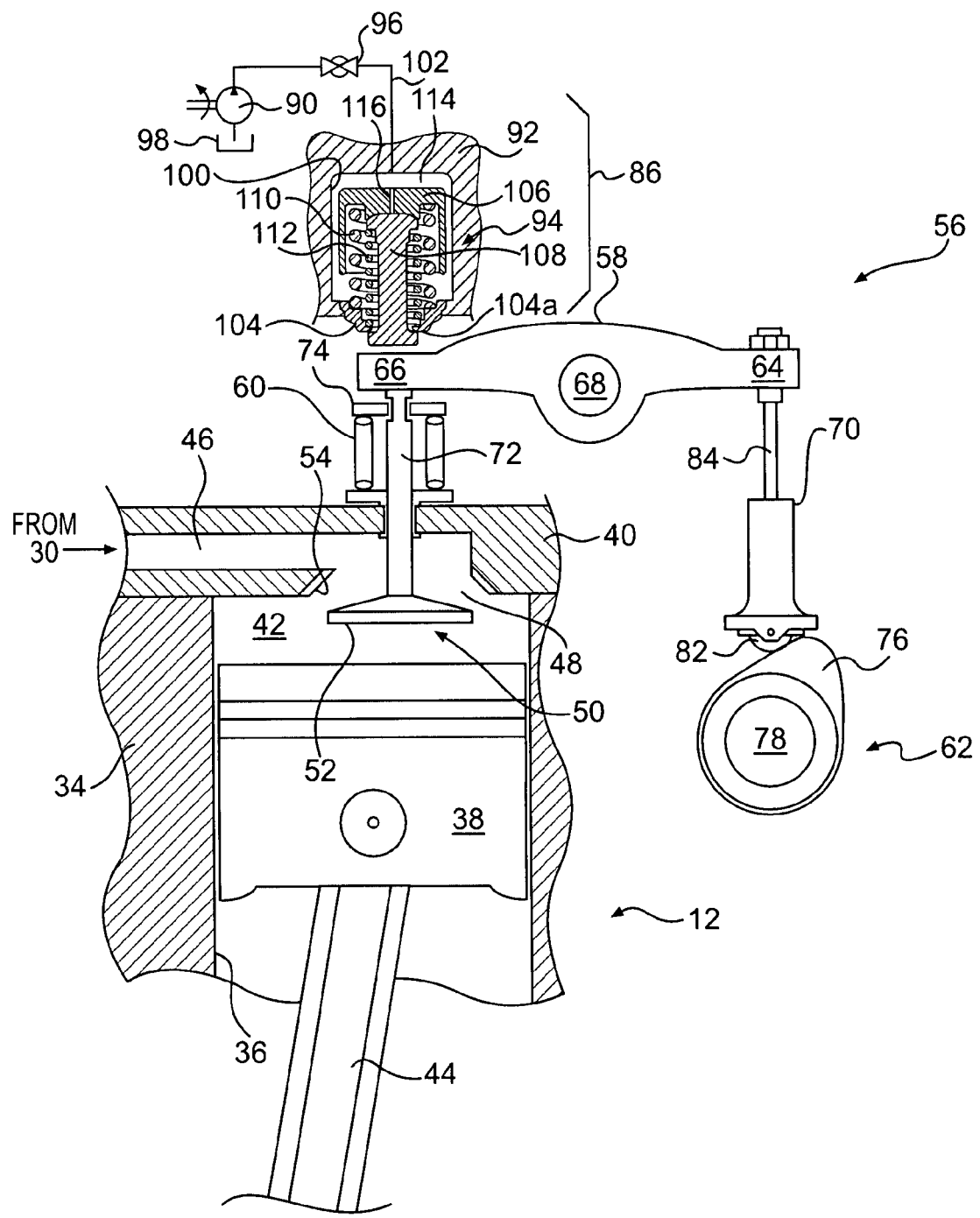
FIG. 2 is a diagrammatic and cross-sectional illustration of an exemplary disclosed engine valve actuator for use with the power system of FIG. 1.

For the purposes of this disclosure, power source 12 is depicted and described as a four-stroke diesel engine. One skilled in the art will recognize, however, that power source 12 may be any other type of internal combustion engine such as, for example, a gasoline or a gaseous fuel-powered engine. Power source 12 may include an engine block 34 that at least partially defines a plurality of cylinders 36 (one of which is illustrated in FIG. 2). As illustrated in FIG. 2, a piston 38 may be slidably disposed within each cylinder 36 to reciprocate between a top-dead-center position and a bottom-dead-center position, and a cylinder head 40 may be associated with each cylinder 36.

Cylinder 36, piston 38, and cylinder head 40 may form a combustion chamber 42. In the illustrated embodiment, power source 12 includes six combustion chambers 42 (referring to FIG. 1). However, it is contemplated that power source 12 may include a greater or lesser number of combustion chambers 42 and that combustion chambers 42 may be disposed in an "in-line" configuration, a "V" configuration, or in any other suitable configuration.

Power source 12 may also include a crankshaft (not shown) that is rotatably disposed within engine block 34. A connecting rod 44 may connect each piston 38 to the crankshaft so that a sliding motion of piston 38 between the top-dead-center and bottom-dead-center positions within each respective cylinder 36 results in a rotation of the crankshaft. Similarly, a rotation of the crankshaft may result in a sliding motion of piston 38 between the top-dead-center and bottom-dead-center positions. In a four-stroke diesel engine, piston 38 may reciprocate between the top-dead-center and bottom-dead-center positions through an intake stroke, a compression stroke, a combustion or power stroke, and an exhaust stroke.

Cylinder head 40 may define an intake passageway 46 and an exhaust passageway (not shown). Intake passageway 46 may direct compressed air from fluid passageway 30, through an intake opening 48, and into combustion chamber 42. The exhaust passageway may similarly direct exhaust gases from combustion chamber 42 to exhaust passageway 29 (referring to FIG. 1).

An intake valve 50 having a valve element 52 may be disposed within intake opening 48 and configured to selectively engage a seat 54. Specifically, valve element 52 may be movable between a first position, at which valve element 52 engages seat 54 to prevent a flow of fluid relative to intake opening 48, and a second position, at which valve element 52 is removed from seat 54 to allow a flow of fluid relative to intake opening 48. An exhaust valve (not shown) may be similarly situated to regulate the flow of exhaust gases from combustion chamber 42.

A series of valve actuation assemblies 56 (one of which is illustrated in FIG. 2) may be operatively associated with power source 12 to move valve element 52 between the first and second positions. Another similar valve actuation assembly (not shown) may be provided to move an element (not shown) of the exhaust valve between first and second spaced apart positions, if desired. It should be noted that each cylinder head 40 could include multiple intake openings 48 and multiple exhaust openings (not shown). Each such opening would have an associated valve element 52. Power source 12 may include a valve actuation assembly 56 for each cylinder head 40 that is configured to actuate all of the intake valves 50 or all of the exhaust valves of that cylinder head 40. It is also contemplated that a single valve actuation assembly 56 could actuate the intake valves 50 associated with multiple cylinder heads 40, if desired. Each valve actuation assembly 56 may include a rocker arm 58, a valve spring 60, a cam arrangement 62, and a cam follower 70. Cam arrangement 62 may rotate to translate cam follower 70 in cyclical fashion, the translation of cam follower 70 inducing a pivoting of rocker arm 58 and subsequent movement of valve element 52 between the first and second positions.

Rocker arm 58 may mechanically move valve element 52 between the first and second positions. Specifically, rocker arm 58 may include a first end 64, a second end 66, and a pivot point 68. First end 64 of rocker arm 58 may be operatively engaged with cam follower 70, while second end 66 may be operatively engaged with valve element 52 through a valve stem 72. A rotation of rocker arm 58 about pivot point 68 may cause valve element 52 to move from the first position to the second position.

Valve spring 60 may act on valve stem 72 through a locking nut 74. In particular, valve spring 60 may bias valve element 52 into the first position, where valve element 52 engages seat 54 to prevent a flow of fluid relative to intake opening 48.

Cam arrangement 62 may be operatively engaged with the crankshaft of power source 12 in any manner readily apparent to one skilled in the art where a rotation of the crankshaft will result in a corresponding rotation of cam arrangement 62. For example, cam arrangement 62 may be connected to the crankshaft through a gear train (not shown) that reduces the rotational speed of cam arrangement 62 to approximately one half of the rotational speed of the crankshaft. As illustrated in FIG. 2, cam arrangement 62 may include a cam lobe 76 fixedly connected to a cam shaft 78. The shape of cam lobe 76 may determine, at least in part, the actuation timing and lift of valve element 52 during normal operation of power source 12.

Cam follower 70 may be adapted to follow the profile of cam lobe 76, as cam lobe 76 rotates with cam shaft 78, and to transfer a corresponding reciprocating motion to rocker arm 58. In particular, cam follower 70 may extend from cam arrangement 62 to first end 64 of rocker arm 58, and include at least one tappet or roller-type protrusion 82. Protrusion 82 may engage and follow the profile of cam lobe 76. As cam arrangement 62 rotates, the profile of cam lobe 76 may cause protrusion 82 and connected cam follower 70 to rise and lower, thereby producing the pivoting motion of rocker arm 58 about pivot point 68. Thus, the rotation of cam arrangement 62 may cause valve element 52 to move from the first position to the second position to create a lift pattern corresponding to a profile of cam lobe 76. It is contemplated that a push rod 84 may be associated with cam follower 70, if desired, and disposed between cam follower 70 and rocker arm 58.

Power system 5 may also include a variable valve actuator (VVA) 86 associated with each valve actuation assembly 56 to move intake valve 50 during modified operation of power source 12. VVA 86 may be configured to interrupt the cam-driven cyclical motion of intake valve 50 and/or the exhaust valve, by selectively disconnecting rocker arm 58 from cam arrangement 62. VVA 86 may be used to implement, for example, engine braking, a version of the Miller Cycle, internal exhaust gas recirculation, or another modified combustion operation. VVA 86 may include a source 90 of pressurized fluid, a housing 92, and a piston assembly 94. Pressurized fluid from source 90 may be directed into housing 92 to bias piston assembly 94 against rocker arm 58, thereby interrupting the motion of rocker arm 58 and intake valve 50 (i.e., separating first end 64 of rocker arm 58 from cam follower 70). A valve 96 may be located between source 90 and housing 92 (or within housing 92, upstream of piston assembly 94) to regulate a flow of the pressurized fluid to piston assembly 94.

Source 90 may draw fluid from a low pressure sump 98 and pressurize the fluid to a predetermine threshold. Source 90 may embody any suitable pump such as, for example, a piston or impeller-type pump having variable or fixed displacement and/or delivery. Source 90 may be dedicated to supplying pressurized fluid to only piston assembly 94 or may, alternatively, supply pressurized fluid to multiple separate hydraulic systems and components, if desired.

Housing 92 may include a bore 100 configured to receive piston assembly 94, and a passageway 102 that fluidly connects bore 100 to source 90. As valve 96 is actuated, pressurized fluid from source 90 may pass through passageway 102 into bore 100 to urge piston assembly 94 out of bore 100. A retaining ring 104 fixedly connected to housing 92 may keep piston assembly 94 from being completely pushed from bore 100 by the pressurized fluid, as well as provide a centering function and a spring biasing surface, as will be described in more detail below.

Piston assembly 94 may include a piston 106, a pin member 108, and inner and outer return springs 110 and 112, respectively. Piston 106 may be received by bore 100 of housing 92, and include an upper bearing surface 114, against which the pressurized fluid from passageway 102 may act. Pin member 108 may be received by an internal cup-like portion of piston 106 in a pivotal relationship. That is, during operation, pin member 108 may be allowed to pivot and/or rotate within the internal cup of piston 106, as piston assembly 94 extends from and retracts back into bore 100. In this manner, any vertical alignment adjustments may be facilitated by the relative pivoting motion between pin member 108 and the internal cup of piston 106. A passageway 116 may extend through surface 114 of piston 106 to provide lubrication to the interface between pin member 108 and the cup-like portion of piston 106.

Inner and outer return springs 110, 112 may urge piston assembly 94 away from engagement with rocker arm 58. Specifically, outer return spring 112 be disposed annularly about pin member 108 and between an inner bearing surface of piston 106 and retaining ring 104 to bias piston 106 against the force of the pressurized fluid (i.e., toward a non-engaging position). Inner return spring 110 may have an inner diameter larger than a shaft portion of pin member 108 (i.e., that portion of pin member 108 connecting opposing ends of pin member 108 having enlarged diameters relative to the shaft portion), yet smaller than the diameters of the opposing ends of pin member 108. Inner return spring 110 may be disposed between an inner bearing surface of pin member 108 and retaining ring 104 to help maintain contact between pin member 108 and piston 106 (i.e., between pin member 108 and the cup-like portion of piston 106). Outer return spring 112 may have an inner diameter greater than the end portions of pin member 108.

Retaining ring 104 may be fixedly connected to housing 92, and have a central opening configured to receive pin member 108. An inner diameter of the central opening may be large enough to allow passage of the shaft portion of pin member 108, yet small enough to prevent the passage of inner return spring 110 and an extended end of pin member 108. In this manner, retaining ring 104 may provide a bearing surface for inner return spring 110, yet the ends of pin member 108 may be enlarged to distribute any loading. Retaining ring 104 may also provide a bearing surface for outer return spring 112.

Retaining ring 104 may have geometry at the inner diameter of the central opening that compliments external geometry of the extended end of pin member 108. This complimentary geometry may cause pin member 108 to become axially aligned with piston 106, as piston 106 is retracted, due to interference or engagement of the complimentary geometry during the retraction. In one example, this complimentary geometry may include an internal tapered surface 104a at the central opening that mates with an external chamfer 108a (only shown in FIGS. 5 and 6) of the extended end of pin member 108. In some embodiments, a predetermined space may be maintained between the tapered surface and the external chamfer, if desired.

Figure 3:
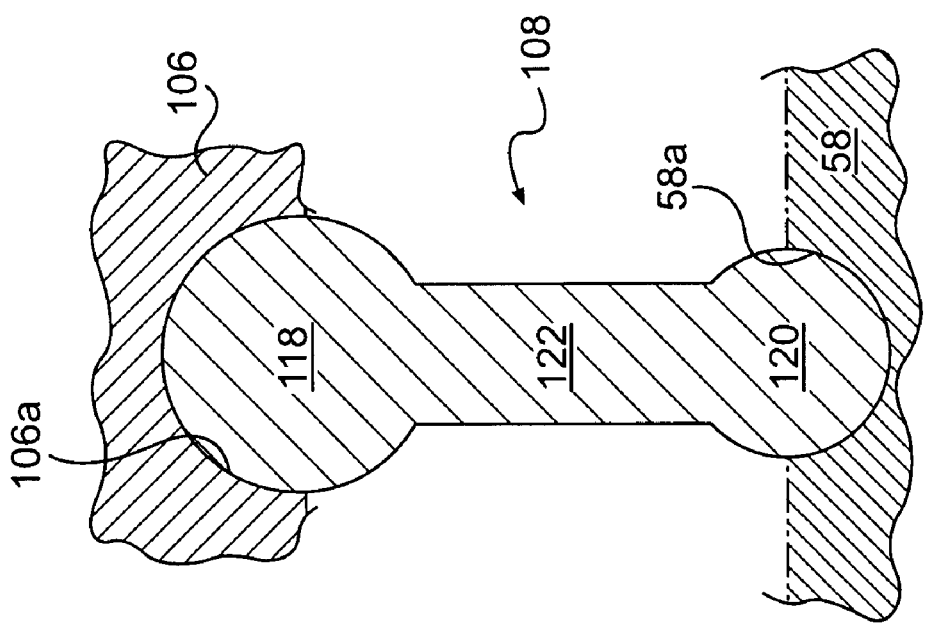
FIG. 3 is a cross-sectional illustration of an exemplary disclosed piston for use with the engine valve actuator of FIG. 2.

FIG. 3 illustrates one exemplary embodiment of pin member 108. In this embodiment, pin member 108 may include a first curved or substantially spherical end 118, and a second opposing curved or substantially spherical end 120. First end 118 may be pivotally received by the internal cup-like portion 106a of piston 106. Similarly, second end 120 may be pivotally received by a cup-like portion 58a of rocker arm 58. Alternatively, second end 120 may be received by a valve bridge (not shown), by intake valve 50, by an exhaust valve, or by any other component such that the cyclical motion of the engine valves may be selectively interrupted. In one embodiment, the cup-like portion 58a may be a separate stand-alone element, if desired. In the embodiment of FIG. 3, the sliding motion between pin member 108 and rocker arm 58 (or other component of valve assembly 56) may be minimized. Instead, pin member 108 may pivot both with respect to piston 106 and with respect to rocker arm 58. By minimizing the relative sliding, wear may also be minimized.

Figure 4:
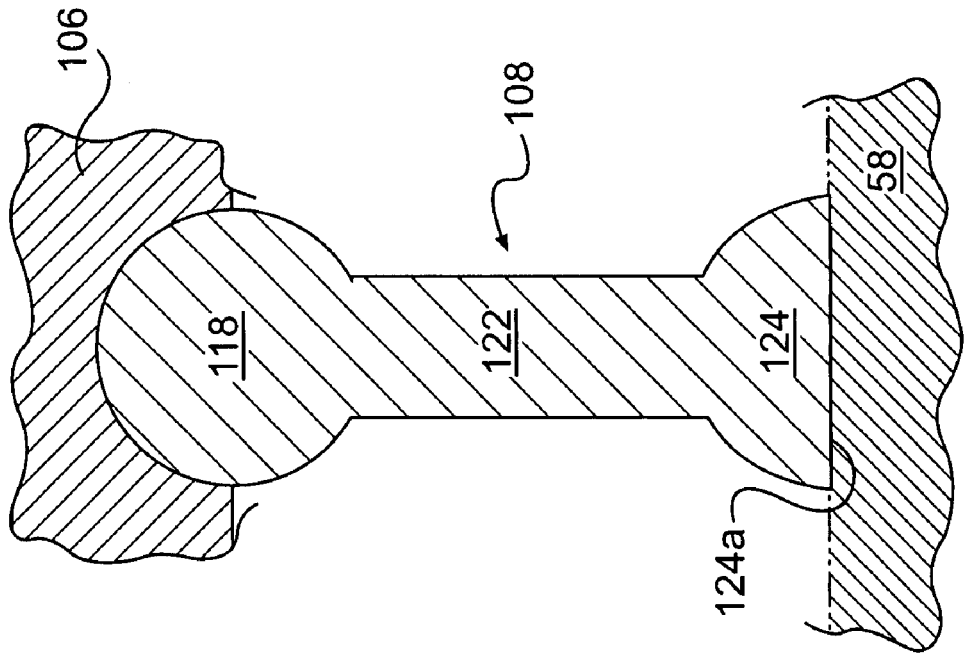
FIG. 4 is a cross-sectional illustration of another exemplary disclosed piston for use with the engine valve actuator FIG. 2.

FIG. 4 illustrates another exemplary embodiment of pin member 108. In the embodiment of FIG. 4, the spherical geometry of second end 120 has been replaced with a second end 124 having a generally planar surface 124a. Surface 124a may be configured to slide along an upper surface of rocker arm 58 and distribute the associated engagement force across its entire cross-sectional area. Because surface 124a may be substantially planar, no special receiving means (i.e., no cup-like geometry) may be required at rocker arm 58.

Figure 5:
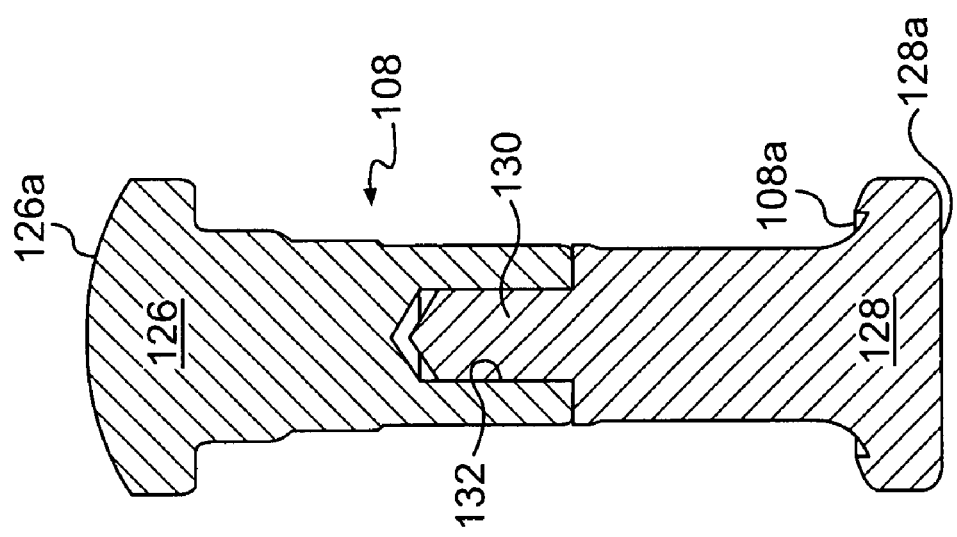
FIG. 5 is a cross-sectional illustration of another exemplary disclosed piston for use with the engine valve actuator of FIG. 2.

FIG. 5 illustrates yet another exemplary embodiment of pin member 108. In this embodiment, pin member 108 is a two-piece assembly consisting of a first element 126 and a second element 128. First element 126 may have a curved surface 126a that pivotally engages the internal cup-like portion 106a of piston 106. Second element 128 may include a generally planar surface 128a that engages rocker arm 58. First and second elements 126, 128 maybe joined together by way of, for example, press-fitting. Specifically, one of first and second elements 126, 128 may include a protrusion 130 that is press-fittingly received by a corresponding bore 132. In the example of FIG. 5, second element 128 may include protrusion 130, while first element 126 may include bore 132. By providing a two-piece design, inner return spring 110 and retaining ring 104 (referring to FIG. 2) may be placed over a shaft portion of either first or second elements 126, 128 prior to the press-fitting operation. This feature may allow first and second elements 126 of pin member 108 to have enlarged diameters at the ends thereof relative to inner return spring 110 and the central portion of retaining ring 104. The enlarged diameters may facilitate the distribution of engagement forces, while the small inner diameter of inner return spring 110 may allow for a compact design.

Figure 6:
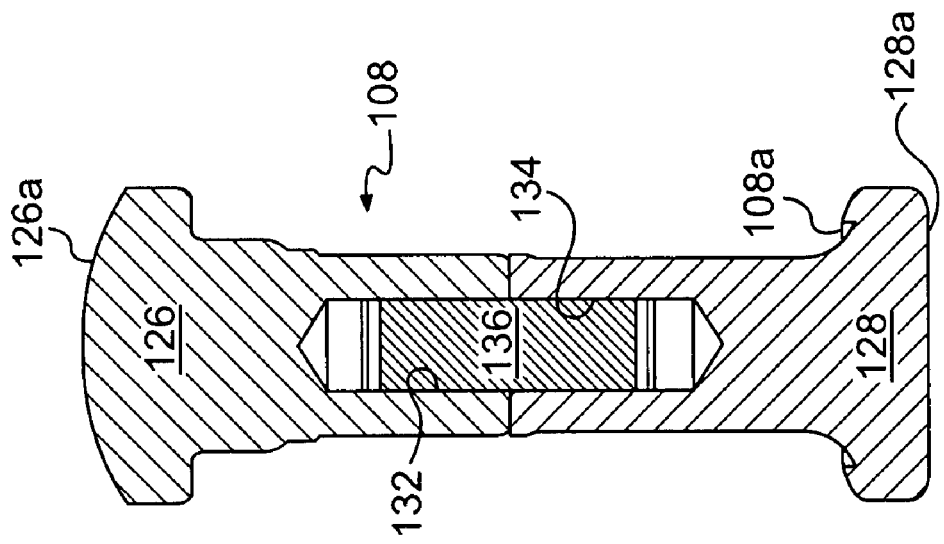
FIG. 6 is a cross-sectional illustration of another exemplary disclosed piston for use with the engine valve actuator of FIG. 2.

FIG. 6 illustrates a final exemplary embodiment of pin member 108. In this embodiment, neither first nor second elements 126, 128 include protrusion 130. Instead, second element 128, like first element 126, may include a bore 134 such that a dowel pin 136 may be press-fitted into both first and second elements 126, 128 to retain the two elements together. This design may help minimize manufacturing requirements and cost.

INDUSTRIAL APPLICABILITY

The disclosed valve actuator may be applicable to any power system where modified engine valve operation is desired. The disclosed actuator may modify engine valve operation by interrupting the cyclical cam-driven motion of an engine valve with a hydraulic piston/pin arrangement having improved durability. The operation of power system 5 will now be explained.

Atmospheric air may be drawn into air induction system 10 by compressors 20 via induction valve 18, where it may be pressurized to a predetermined level before entering combustion chambers 42 of power source 12. Fuel may be mixed with the pressurized air before or after the air enters combustion chambers 42. This fuel-air mixture may then be combusted by power source 12 to produce mechanical work and an exhaust flow containing gaseous compounds and solid particulate matter. The exhaust flow may be directed from power source 12 to turbines 26 where the expansion of hot exhaust gasses may cause turbines 26 to rotate, thereby rotating connected compressors 20 and compressing the inlet air. After exiting turbines 26, the exhaust gas flow may be directed to the atmosphere.

The combustion of fuel and air within power source 12 may cause a rotation of cam arrangement 62 via the crankshaft of power source 12. Cam arrangement 62 may act through cam follower 70 and rocker arm 58 to move valve element 52 away from seat 54, thereby initiating a conventional valve event. The initiation of a conventional valve event may coincide with the downward movement of piston 38 to draw air and fuel into combustion chamber 42. As cam arrangement 62 continues to rotate, valve spring 60 may act to return valve element 52 to the flow blocking position, thereby ending the valve event. The end of the conventional valve event may be timed to coincide with the movement of piston 38 to the bottom-dead-center position at the end of the intake stroke. Similarly, the exhaust valve (not shown) may be moved to allow piston 38 to push exhaust gas out of combustion chamber 42 during a conventional exhaust stroke of piston 38 from bottom-dead-center to top-dead-center.

A non-conventional valve event (i.e., a modified valve event) may be possible through the use of VVA 86. That is, if a non-conventional valve event such as, for example, an internal exhaust gas recirculation event (i.e., an overlapping of intake and exhaust valves during an exhaust stroke of piston 38), a braking event (i.e., an opening of the exhaust valve during an end of a compression stroke), a Miller cycle event (i.e., an extended opening duration of intake valve 50 into a portion of the compression stroke), or another event is desired, valve 96 may be selectively opened to pass pressurized fluid into housing 92. Within housing 92, the pressurized fluid may act on surface 114 of piston 106 to extend piston 106 and pin member 108 from bore 100 against the biases of inner and outer return springs 110, 112 and into engagement with rocker arm 58. As rocker arm continues to rotate under the driving force of cam lobe 76 and while the pressure is building within bore 100, the generally planar surface 124a, 128a of pin member 108 may slide along the upper surface of rocker arm 58, thereby helping to ensure perpendicularity of pin member 108 relative to rocker arm 58. While sliding at one end, pin member 108 may pivot somewhat relative to piston 106 at the opposing end. Once the pressure within bore 100 has built sufficiently, the engagement between pin member 108 and rocker arm 58 may cause rocker arm 58 to open the appropriate one or both of intake valve 50 and the exhaust valve or to maintain the selected valve(s) in an already opened position, thereby initiating the non-conventional valve event.

Toward the end of the non-conventional valve event, the open engine valve may be closed (or motion thereof released to follow the profile of cam lobe 76) by closing valve 96 or otherwise relieving the pressurized fluid from acting on surface 114 of piston 106. As the fluid drains from bore 100, outer return spring 112 may urge piston 106 to retract back into bore 100. During the retraction of piston 106, inner return spring 110 may also urge pin member 108 back into bore 100, thereby helping to maintain contact between pin member 108 and piston 106. As pin member 108 passes through retaining ring 104 back into bore 100, tapered surface 104a at the central opening of retaining ring 104 may engage or strike against the outer surface, and more specifically, against chamfer 108a of pin member 108, thereby axially aligning pin member 108 with piston 106 in preparation for a subsequent extending engagement of pin member 108.

Several advantages may be associated with the disclosed variable valve actuator. In particular, because retaining ring 104 may help center (i.e., axially align) pin member 108 with piston 106 during the retraction of piston 106, less side loading of pin member 108 and edge loading of rocker arm 58 may occur during a subsequent extending/engaging motion of pin member 108. In addition, the enlarged diameters of pin member 108 may better distribute the forces associated with the engagement of pin member 108 with rocker arm 58, as well as provide an increased lever arm for any edge loading of rocker arm 58. Further, the enlarged pin member end may improve lash setting by means of a feeler gauge, since the larger area is less able to tip when the feeler gauge is inserted between pin member 108 and rocker arm 58. The increased lever arm may help to slide pin member 108 into perpendicular contact with the upper surface of rocker arm 58 before the loading increases to the point where the pin edge will indent the rocker arm surface. And, since pin member 108 may be a two-piece design, inner return spring 110 may fit around and within the footprint of pin member 108, thereby conserving space within VVA 86.

It will be apparent to those skilled in the art that various modifications and variations can be made to the disclosed variable valve actuation system. Other embodiments will be apparent to those skilled in the art from consideration of the specification and practice of the disclosed variable valve actuation system. It is intended that the specification and examples be considered as exemplary only, with a true scope being indicated by the following claims and their equivalents.

What is claimed is:

1. A variable valve actuator comprising:
    a housing;
    a hydraulic piston assembly that includes a multi-piece pin biased by a spring into contact with a piston;
    the multi-piece pin includes a first element with first planar surface in contact with a second planar surface of a second element;
    the first element includes a large diameter end portion in contact with the piston;
    the second element includes a large diameter end portion that is movable away from the housing to interrupt a cam-driven cyclical motion of a valve;
    at least one of the first element and the second element includes a small diameter shaft segment;
    the spring being mounted about the small diameter shaft segment, and being trapped between the large diameter end portion of the first element and the large diameter end portion of the second element; and
    wherein at least one of the first element and the second element defines a bore that opens through a respective one of the first planar surface and the second planar surface.

2. The variable valve actuator of claim 1 including a retaining ring attached to housing and surrounding the small diameter shaft segment; and
    the spring is compressed between the retaining ring and the large diameter end portion of the first element.

3. The variable valve actuator of claim 2 wherein a maximum inner diameter of the spring is smaller than either of the large diameter end portion of the first element and the large diameter end portion of the second element.

4. The variable valve actuator of claim 3 wherein the large diameter end portion of the first element terminates in a curved surface in contact with a cup-like surface of the piston.

5. The variable valve actuator of claim 4 including a dowel extending through the first planar surface and the second planar surface.

6. The variable valve actuator of claim 4 wherein the spring is an inner spring in contact with the retaining ring and the large diameter end portion of the first element; and
    an outer spring in contact with, and compressed between, the retaining ring and the piston.

7. The variable valve actuator of claim 4 wherein the large diameter end portion of the second element terminates at planar contact surface.

8. The variable valve actuator of claim 4 wherein the retaining ring includes an internal tapered surface that contacts a complimentary external chamfer on the large diameter end portion of the second element when the hydraulic piston assembly is in a retracted position.

9. The variable valve actuator of claim 8 including a dowel extending through the first planar surface and the second planar surface.

10. The variable valve actuator of claim 9 wherein the spring is an inner spring in contact with the retaining ring and the large diameter end portion of the first element; and
    an outer spring in contact with, and compressed between, the retaining ring and the piston.

11. The variable valve actuator of claim 10 wherein the large diameter end portion of the second element terminates at planar contact surface.

12. The variable valve actuator of claim 11 wherein the spring is an inner spring in contact with the retaining ring and the large diameter end portion of the first element; and
    an outer spring in contact with, and compressed between, the retaining ring and the piston.

13. The variable valve actuator of claim 12 wherein the large diameter end portion of the second element terminates at planar contact surface.

14. The variable valve actuator of claim 13 wherein the spring is an inner spring in contact with the retaining ring and the large diameter end portion of the first element; and
    an outer spring in contact with, and compressed between, the retaining ring and the piston.

* * * * *